(12) United States Patent
Du

(10) Patent No.: US 9,535,299 B2
(45) Date of Patent: Jan. 3, 2017

(54) BONDING PAD STRUCTURE OF LIQUID CRYSTAL DISPLAY AND METHOD OF MANUFACTURING THE SAME

(71) Applicant: SHENZHEN CHINA STAR OPTOELECTRONICS TECHNOLOGY CO., LTD., Shenzhen, Guangdong (CN)

(72) Inventor: Peng Du, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 348 days.

(21) Appl. No.: 14/375,629

(22) PCT Filed: Jul. 7, 2014

(86) PCT No.: PCT/CN2014/081769
§ 371 (c)(1),
(2) Date: Jul. 30, 2014

(87) PCT Pub. No.: WO2016/000271
PCT Pub. Date: Jan. 7, 2016

(65) Prior Publication Data
US 2016/0274405 A1    Sep. 22, 2016

(30) Foreign Application Priority Data
Jul. 1, 2014   (CN) .......................... 2014 1 0310276

(51) Int. Cl.
H05K 1/03        (2006.01)
G02F 1/1345    (2006.01)
(Continued)

(52) U.S. Cl.
CPC ......... G02F 1/13458 (2013.01); G02F 1/1368 (2013.01); G02F 1/13439 (2013.01);
(Continued)

(58) Field of Classification Search
CPC   G02F 1/13458; G02F 1/1368; G02F 1/13439; G02F 1/136227; G02F 2001/13606
(Continued)

(56) References Cited

U.S. PATENT DOCUMENTS 7,369,202 B2   5/2008   Ahn et al.
7,411,216 B2   8/2008   Kim et al.
(Continued)

FOREIGN PATENT DOCUMENTS

CN   1577025   2/2005
CN   1607445   4/2005
(Continued)

OTHER PUBLICATIONS

International Search Report for PCT/CN2014/081769, English translation attached to original, Both completed by the Chinese Patent Office on Mar. 18, 2015, All together 6 Pages.

*Primary Examiner* — Sherman Ng
(74) *Attorney, Agent, or Firm* — Brooks Kushman P.C.

(57) ABSTRACT

A bonding pad structure of liquid crystal display, having a plurality of bonding pads formed at part of the upper surface of the edge area of the substrate, and an overcoat layer with one side being inclined surface and positioned at the other part of upper surface of the bonding pad. The inclined surface is formed when patterning the overcoat layer covering the bonding pad by using the mask with gradient transmittance and removing the overcoat layer formed at part of the upper surface of the bonding pad. Also discloses a manufacturing method of the bonding pad structure of liquid crystal display.

11 Claims, 3 Drawing Sheets

(51) Int. Cl.
*G02F 1/1368* (2006.01)
*G02F 1/1343* (2006.01)
*G02F 1/1362* (2006.01)
*G02F 1/136* (2006.01)

(52) U.S. Cl.
CPC ............... *G02F 1/136227* (2013.01); *G02F 2001/13606* (2013.01)

(58) Field of Classification Search
USPC ........................................................ 174/255
See application file for complete search history.

(56) References Cited

U.S. PATENT DOCUMENTS

| | | | |
|---|---|---|---|
| 7,511,782 B2 | 3/2009 | Oh et al. | |
| 2003/0168746 A1 | 9/2003 | You | |
| 2004/0266041 A1* | 12/2004 | Kim | G02F 1/13458 438/30 |
| 2005/0117094 A1* | 6/2005 | Kim | G02F 1/133512 349/110 |
| 2007/0004071 A1* | 1/2007 | Lee | G02F 1/133707 438/30 |
| 2007/0210458 A1 | 9/2007 | Hagio | |
| 2008/0090083 A1* | 4/2008 | Park | G02F 1/133516 428/411.1 |
| 2009/0173943 A1* | 7/2009 | Yu | H01L 27/124 257/59 |
| 2013/0341624 A1* | 12/2013 | Cho | H01L 29/786 257/57 |

FOREIGN PATENT DOCUMENTS

| | | |
|---|---|---|
| CN | 1677209 | 10/2005 |
| CN | 101034693 | 9/2007 |

\* cited by examiner

BONDING PAD STRUCTURE OF LIQUID CRYSTAL DISPLAY AND METHOD OF MANUFACTURING THE SAME

CROSS-REFERENCE TO RELATED APPLICATION

This application is the U.S. national phase of PCT Application No. PCT/CN2014/081769 filed on Jul. 7, 2014, which claims priority to CN Patent Application No. 201410310276.X filed on Jul. 1, 2014, the disclosures of which are incorporated in their entirety by reference herein.

TECHNICAL FIELD

The present invention relates to the liquid crystal display field, and more particularly, to a bonding pad structure of liquid crystal display and a method of manufacturing the same.

BACKGROUND ART

With the increase in size of the liquid crystal display (LCD), the RC delay of various signal lines in the LCD may become more apparent, which will result in less efficient pixel charge and eventually affect the display quality of the LCD.

In order to reduce the stray capacitance between the signal lines and lower the RC delay, the current solution is adding one overcoat layer having a huge thickness after the second layer of metal (i.e. the metal for manufacturing the source and drain) of the array substrate is manufactured. The overcoat layer may increase the distance from the second layer of metal to the pixel electrode and the public electrode, thus can be used to reduce the stray capacitance.

In addition, in order to save the cost, the overcoat layer and the passivation layer are manufactured at the same time, also, a relatively large opening area is manufactured at the edge area of the array substrate so as to expose the bonding pad structure. However, since the thickness of the manufactured overcoat layer is relatively large (normally being 1.5 μm to 3.0 μm), the conductive layer can be easily broken when being manufactured on the bonding pad structure and the overcoat layer.

In addition, the bonding pad structure is electrically connected to, for example, the chip on the film (COF) through the anisotropic conductive film (ACF), and the conductive particles are scattered in the ACF. When the ACF is pressed, the conductive particles will move toward the periphery of the bonding pad structure, wherein a part of the conductive particles will reach the bottom of the overcoat layer; since the thickness of the overcoat layer is relatively large, the part of conductive particles may hardly go over the overcoat layer so as to gather at the bottom part of the overcoat layer, hence causing the short circuit between different signal lines (such as the scan line and the data line).

SUMMARY

In order to solve the problem existing in the prior art, the present invention aims to provide a manufacturing method of the bonding pad structure of the liquid crystal display. The method at least includes: A) forming a plurality of bonding pads at part of the upper surface of the edge area of the substrate; C) forming an overcoat layer at part of the upper surface of the edge area of the substrate, and covering the bonding pad; D) patterning the overcoat layer by using the mask with gradient transmittance, and forming a side of the overcoat layer formed at the other part of the upper surface of the bonding pad to be an inclined surface when removing the overcoat layer formed at a part of the upper surface of the bonding pad.

Furthermore, before performing step C), the manufacturing method further includes: B) forming an insulating layer at part of the upper surface of the edge area of the substrate, and covering the bonding pad.

Furthermore, the step D) is replaced as: E) patterning the overcoat layer and the insulating layer by using the mask with gradient transmittance, and forming a side of the overcoat layer formed at the other part of the upper surface of the bonding pad to be an inclined surface when removing the overcoat layer and the insulating layer formed at a part of the upper surface of the bonding pad.

Furthermore, the step D) is replaced as: E) patterning the overcoat layer and the insulating layer by using the mask with gradient transmittance, and forming a side of the overcoat layer formed at the other part of the upper surface of the bonding pad to be an inclined surface when removing part of the overcoat layer and the insulating layer formed at a part of the upper surface of the bonding pad.

Furthermore, the manufacturing method further includes: forming a conductive layer at part of the upper surface of the edge area of the substrate, wherein the conductive layer covers the part of the upper surface of the bonding pad, the inclined surface and the top surface of the overcoat layer.

Furthermore, the manufacturing method further includes: forming a conductive layer at part of the upper surface of the edge area of the substrate, wherein the conductive layer covers part of the upper surface of the bonding pad which is not covered by other part of the insulating layer, the rest of the upper surface of the insulating layer, and the inclined surface and the top surface of the overcoat layer.

The present invention also aims to provide a bonding pad structure of the liquid crystal display, at least including: a plurality of bonding pads formed at part of the upper surface of the edge area of the substrate; an overcoat layer with one side being inclined surface and positioned at the other part of upper surface of the bonding pad, wherein the inclined surface is formed when patterning the overcoat layer covering the bonding pad by using the mask with gradient transmittance and removing the overcoat layer formed at part of the upper surface of the bonding pad.

Furthermore, the bonding pad structure further includes: an insulating layer positioned between the other part of upper surface of the bonding pad and the overcoat layer.

Furthermore, the bonding pad structure further includes: an insulating layer, wherein part of the insulating layer is positioned between the other part of the upper surface of the bonding pad and the overcoat layer, while the rest of the insulating layer is positioned at part of the upper surface of the bonding pad.

Furthermore, the bonding pad structure further includes: a conductive layer covering part of the upper surface of the bonding pad, the inclined surface and the top surface of the overcoat layer.

Furthermore, the bonding pad structure further includes: a conductive layer covering part of the upper surface of the bonding pad which is not covered by other part of the insulating layer, the rest of the upper surface of the insulating layer, and the inclined surface and the top surface of the overcoat layer.

The present invention may flatten the inclined surface of the overcoat layer by forming a side of the overcoat layer as inclined surface and greatly reducing the inclination angle (i.e. the intersection angle between the inclined surface and the bottom surface of the overcoat layer) of the inclined surface of the overcoat layer. In this way, the conductive layer may not be easily broken when being formed. In addition, after the bonding pad structure of the present invention is electrically connected to, for example, the COF through the ACF, if the ACF is pressed, part of the conductive particles in the ACF will move toward to the periphery of the bonding pad structure; since the inclined surface of the overcoat layer is relatively gentle, the above part of conductive particles may easily go over the inclined surface of the overcoat layer, thus cannot be easily gathered at the bottom of the inclined surface of the overcoat layer, hence avoiding short circuit between different signal lines (such as the scan line and the data line).

BRIEF DESCRIPTION OF THE DRAWINGS

The above and/or other aspects, features, and advantages of the embodiments of the invention will become more apparent from the following description, taken in conjunction with the accompanying drawings, in which.

DETAILED DESCRIPTION OF EXEMPLARY EMBODIMENTS

Embodiments of the present invention will be described in detail below by referring to the accompany drawings. However, the present invention may be implemented in many different forms, and should not be interpreted as being confined to the specific embodiments illustrated herein. On the contrary, the embodiments are provided to illustrate the principle and actual practice of the present invention, so that the other skilled in the art might understand the various embodiments of the present invention and the various amendments applied to specific anticipation.

Figure 1:
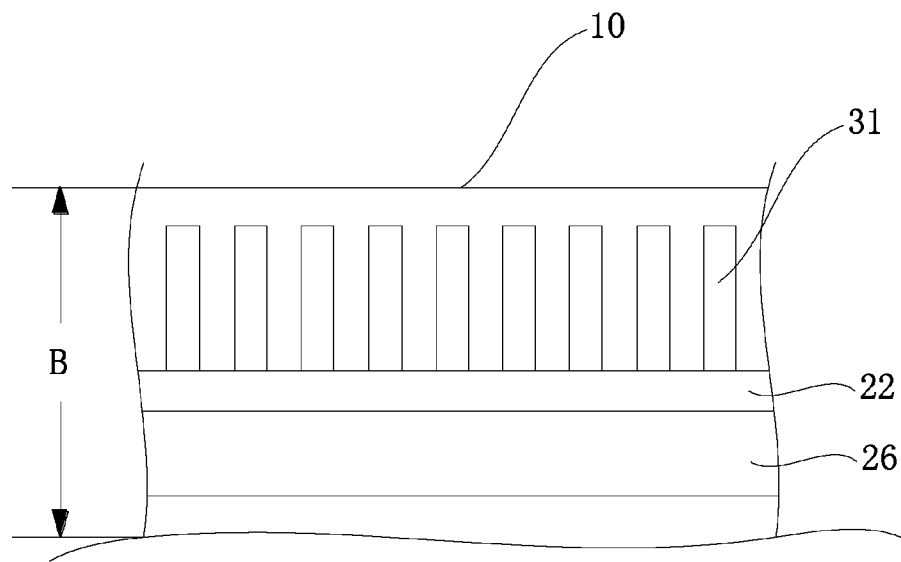
FIG. 1 is a top view of part of bonding pad structure of the liquid crystal display according to an embodiment of the present invention.
Figure 2:
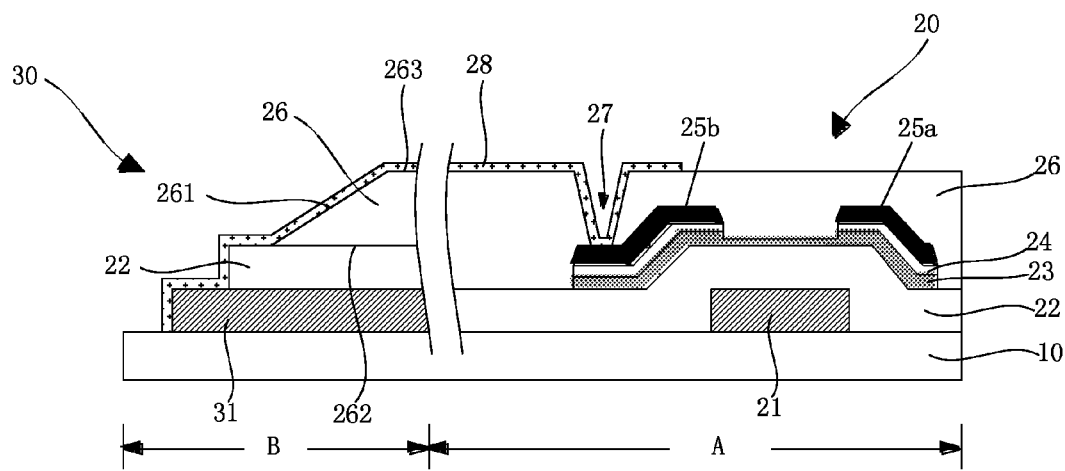
FIG. 2 is a lateral section view of part of the liquid crystal display according to an embodiment of the present invention.

FIG. 1 is a top view of part of bonding pad structure of the liquid crystal display according to an embodiment of the present invention. FIG. 2 is a lateral section view of part of the liquid crystal display according to an embodiment of the present invention.

Referring to FIG. 1 and FIG. 2, a thin film transistor (TFT) 20 is provided on part of the upper surface of the pixel area A of a substrate (e.g. the glass substrate); wherein the thin film transistor 20 includes a gate electrode 21, an insulating layer 22, an active layer constituted by an amorphous layer 23 and an ohmic contact layer 24, a source electrode (metal layer) 25a and a drain electrode (metal layer) 25b on the active layer, an overcoat layer 26, a through hole 27 provided above the drain electrode 25b and formed in the overcoat layer 26, and a transparent electrode layer (i.e. the indium tin oxide (ITO) electrode layer) 28 provided in the through hole 27 and electrically connected with the drain electrode 25b formed sequentially on a part of the upper surface of the pixel area A of the substrate 10.

A bonding pad structure 30 is provided at a part of the upper surface of the edge area B of the substrate 10; wherein, the bonding pad structure 30 includes a plurality of bonding pads 31, an insulating layer 22, an overcoat layer 26, and a transparent electrode layer 28 formed sequentially on a part of the upper surface of the edge area B of the substrate 10. In addition, since the overcoat layer 26 has the insulation function, as another embodiment of the present invention, the insulating layer 22 may not be formed on the upper surface of the bonding pad 31.

The bonding pad 31 and the gate electrode 21 of the thin film transistor 20 are formed at the same time, but the present invention is not limited thereto. One side of the overcoat layer 26 is an inclined surface 261, and is positioned at another part of upper surface of the bonding pad 31. In addition, the inclined surface 261 is formed when performing patterning process on the overcoat layer 26 positioned at the edge area B and covering the bonding pad 31 by using the mask with gradient transmittance, and removing the overcoat layer 26 formed on a part of the upper surface of the bonding pad 31. A part of the insulating layer 22 positioned at the edge area B is positioned between the another part of upper surface of the bonding pad 31 and the overcoat layer 26, while the rest of the insulating layer 22 is positioned at part of the upper surface of the bonding pad 31. The transparent electrode layer 28 covers a part of the upper surface of the bonding pad 31 which is not covered by other part of the insulating layer 22, the rest of the upper surface of the insulating layer 22, and the top surface 263 of the overcoat layer 26 positioned at the edge area B.

In the present embodiment, the inclined surface 261 is formed by using the mask with gradient transmittance, the inclined angle (i.e. the intersection angle between the inclined surface 261 and the bottom surface 262 of the overcoat layer 26) of the inclined surface 261 can be greatly reduced, thus the inclined surface 261 of the overcoat layer 26 can be flattened. In this way, the transparent electrode layer 28 may not be easily broken when being formed. In addition, after the bonding pad structure 30 of the present embodiment is electrically connected to, for example, the COF through the ACF, if the ACF is pressed, part of the conductive particles in the ACF will move toward to the periphery of the bonding pad structure 30; since the inclined surface 261 of the overcoat layer 26 is relatively gentle, the above part of conductive particles may easily go over the inclined surface 261 of the overcoat layer 26, thus cannot be easily gathered at the bottom of the inclined surface 261 of the overcoat layer 26, hence avoiding short circuit between different signal lines (such as the scan line and the data line).

Figure 3:
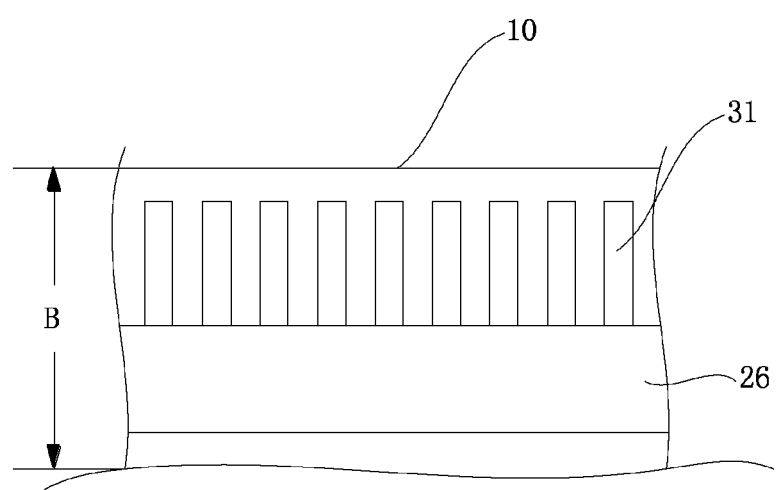
FIG. 3 is a top view of part of bonding pad structure of the liquid crystal display according to another embodiment of the present invention.
Figure 4:
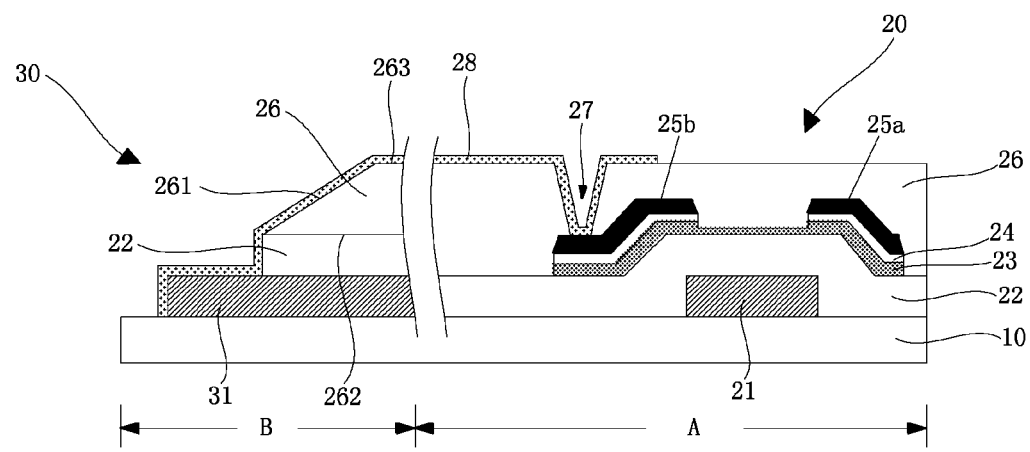
FIG. 4 is a lateral section view of part of the liquid crystal display according to another embodiment of the present invention.

As another embodiment of the present invention, referring to FIG. 3 and FIG. 4, the other part of the insulating layer 22 positioned at a part of the upper surface of the bonding pad 31 can also be removed. In this way, the transparent electrode layer 28 covers a part of the upper surface of the bonding pad 31, and the upper surface 263 of the overcoat layer 26 positioned at the edge area B. Based on above, the manufacturing can be simplified, and the width of the bonding pad 31 not covered by the overcoat layer 26 can be reduced, which may facilitate the design on narrow frame of the liquid crystal display.

Since the manufacturing of the thin film transistor 20 in the present embodiment has become the prior art, in order to avoid repetition, the manufacturing method of the thin film transistor 20 will not be explained herewith. Hereinafter, only the manufacturing method of the bonding pad structure of the liquid crystal display of the present embodiment will be illustrated.

Figure 5:
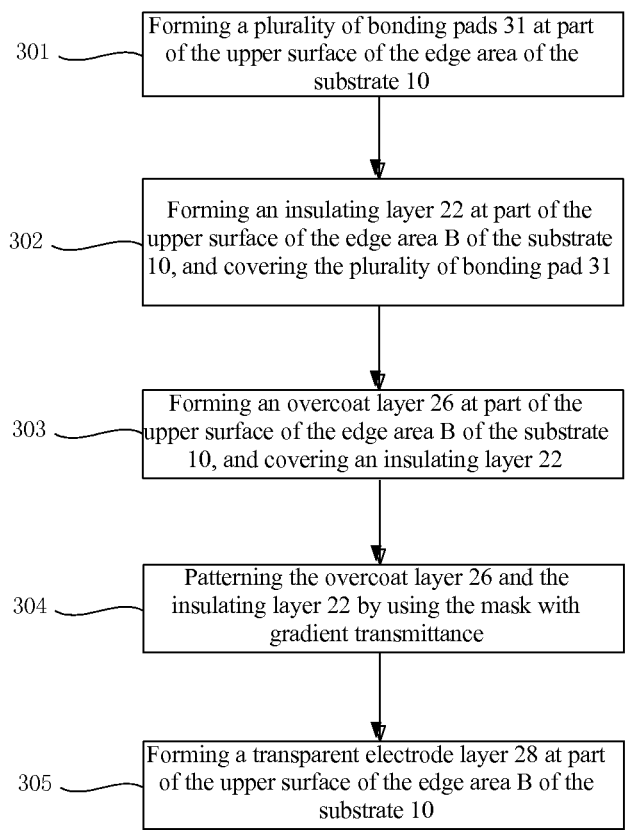
FIG. 5 is a flow chart of the manufacturing method of the bonding pad structure of the liquid crystal display according to an embodiment of the present invention.

FIG. 5 is a flow chart of the manufacturing method of the bonding pad structure of the liquid crystal display according to an embodiment of the present invention.

Referring to FIG. 1, FIG. 2 and FIG. 5, in operation 301, a plurality of bonding pads 31 are formed at part of the upper surface of the edge area of the substrate 10. Here, the bonding pad 31 and the gate electrode 21 of the thin film transistor 20 are formed at the same time, that is to say, the bonding pad 31 and the gate electrode 21 of thin film transistor 20 may adopt the same material, while the present invention is not limited thereto.

In operation 302, forming an insulating layer 22 at part of the upper surface of the edge area B of the substrate 10, and covering the plurality of bonding pad 31.

In operation 303, forming an overcoat layer 26 at part of the upper surface of the edge area B of the substrate 10, and covering an insulating layer 22.

In operation 304, patterning the overcoat layer 26 and the insulating layer 22 by using the mask with gradient transmittance, and forming a side of the overcoat layer 26 formed at the other part of the upper surface of the bonding pad 31 to be an inclined surface 261 when removing a part of the overcoat layer 26 and the insulating layer 22 formed at a part of the upper surface of the bonding pad 31.

Here, to be sure, the rest of the insulating layer 22 is positioned at a part of the upper surface of the bonding pad 31. The mask with gradient transmittance means that: the part of the mask corresponding to part of upper surface of the bonding pad 31 is transparent (i.e. 100% transmittance), the part corresponding to the inclined surface 261 may have gradient transmittance (that is, the transmittance gradually decreases from the part corresponding to the bottom of the inclined surface 261 to the part corresponding to the top of the inclined surface 261), and the part corresponding to the top surface 263 of the overcoat layer 26 may have a transmittance of 0%. In addition, the mask with gradient transmittance may also be the mask having gradient slit density (i.e. the gradient transmittance), which means that: the part of the mask corresponding to part of the upper surface of the bonding pad 31 may have larger slit density, the part corresponding to the inclined surface 261 may have gradient slit density (that is, the slit density gradually decreases from the part corresponding to the bottom of the inclined surface 261 to the part corresponding to the top of the inclined surface 261), and the part corresponding to the top surface 263 of the overcoat layer 26 may have the smallest slit density (or without slit).

In operation 305, a transparent electrode layer 28 is formed at part of the upper surface of the edge area B of the substrate 10. Here, the transparent electrode layer 28 covers a part of the upper surface of the bonding pad 31 which is not covered by other part of the insulating layer 22, the rest of the upper surface of the insulating layer 22, and the top surface 263 of the overcoat layer 26 positioned at the edge area B.

In addition, among the above operations, operation 302 can be removed, that is, after performing operation 301, the operation 303 can be directly performed. Accordingly, among the operations 303, 304 and 305, the operation performed on the insulating layer 22 can be removed accordingly.

As another embodiment of the present invention, in operation 304, patterning the overcoat layer 26 and the insulating layer 22 by using the mask with gradient transmittance, and forming a side of the overcoat layer 26 formed at the other part of the upper surface of the bonding pad 31 to be an inclined surface 261 when removing the overcoat layer 26 and the insulating layer 22 formed at a part of the upper surface of the bonding pad 31. In operation 305, a transparent electrode layer 28 is formed at part of the upper surface of the edge area B of the substrate 10. Here, the transparent electrode layer 28 covers the part of the upper surface of the bonding pad 31, and the upper surface 263 of the overcoat layer 26 positioned at the edge area B. Based on above, the manufacturing can be simplified, and the width of the bonding pad 31 not covered by the overcoat layer 26 can be reduced, which may facilitate the design on narrow frame of the liquid crystal display.

Although the present invention is described with reference to the special exemplary, it will be understood by those skilled in the art that various changes in form and details may be made therein without departing from the spirit and scope of the present invention as defined by the following claims and its equivalents.

What is claimed is:

1. A manufacturing method of a bonding pad structure of liquid crystal display, at least including:
   A) forming a plurality of bonding pads at part of the upper surface of the edge area of the substrate;
   C) forming an overcoat layer at part of the upper surface of the edge area of the substrate, and covering the bonding pad;
   D) patterning the overcoat layer by using a mask with gradient transmittance, and forming a side of the overcoat layer formed at the other part of the upper surface of the bonding pad to be an inclined surface when removing the overcoat layer formed at a part of the upper surface of the bonding pad.

2. The manufacturing method of claim 1, wherein, before performing step C), the method further includes:
   B) forming an insulating layer at part of the upper surface of the edge area of the substrate, and covering the bonding pad.

3. The manufacturing method of claim 2, wherein the step D) is replaced as:
   E) patterning the overcoat layer and the insulating layer by using the mask with gradient transmittance, and forming a side of the overcoat layer formed at the other part of the upper surface of the bonding pad to be an inclined surface when removing the overcoat layer and the insulating layer formed at a part of the upper surface of the bonding pad.

4. The manufacturing method of claim 2, wherein the step D) is replaced as:
   E) patterning the overcoat layer and the insulating layer by using the mask with gradient transmittance, and forming a side of the overcoat layer formed at the other part of the upper surface of the bonding pad to be an inclined surface when removing part of the overcoat layer and the insulating layer formed at a part of the upper surface of the bonding pad.

5. The manufacturing method of claim 3, wherein the method further includes: forming a conductive layer at part of the upper surface of the edge area of the substrate, wherein the conductive layer covers the part of the upper surface of the bonding pad, the inclined surface and the top surface of the overcoat layer.

6. The manufacturing method of claim 4, wherein the method further includes: forming a conductive layer at part of the upper surface of the edge area of the substrate, wherein the conductive layer covers part of the upper surface of the bonding pad which is not covered by other part of the insulating layer, the rest of the upper surface of the insulating layer, and the inclined surface and the top surface of the overcoat layer.

7. A bonding pad structure of liquid crystal display, at least including:
   a plurality of bonding pads formed at part of the upper surface of the edge area of the substrate;
   an overcoat layer with one side being inclined surface and positioned at the other part of upper surface of the bonding pad, wherein the inclined surface is formed when patterning the overcoat layer covering the bonding pad by using a mask with gradient transmittance and removing the overcoat layer formed at part of the upper surface of the bonding pad.

8. The bonding pad structure of claim 7, wherein the structure further includes: an insulating layer positioned between the other part of upper surface of the bonding pad and the overcoat layer.

9. The bonding pad structure of claim 7, wherein the structure further includes: an insulating layer, wherein part of the insulating layer is positioned between the other part of the upper surface of the bonding pad and the overcoat layer, while the rest of the insulating layer is positioned at part of the upper surface of the bonding pad.

10. The bonding pad structure of claim 8, wherein the structure further includes: a conductive layer covering part of the upper surface of the bonding pad, the inclined surface and the top surface of the overcoat layer.

11. The bonding pad structure of claim 9, wherein the structure further includes: a conductive layer covering part of the upper surface of the bonding pad which is not covered by other part of the insulating layer, the rest of the upper surface of the insulating layer, and the inclined surface and the top surface of the overcoat layer.

* * * * *